June 19, 1962 P. FARAGO 3,039,788
STEERABLE WHEEL VEHICLE SUSPENSION ARRANGEMENT
Filed Sept. 30, 1959
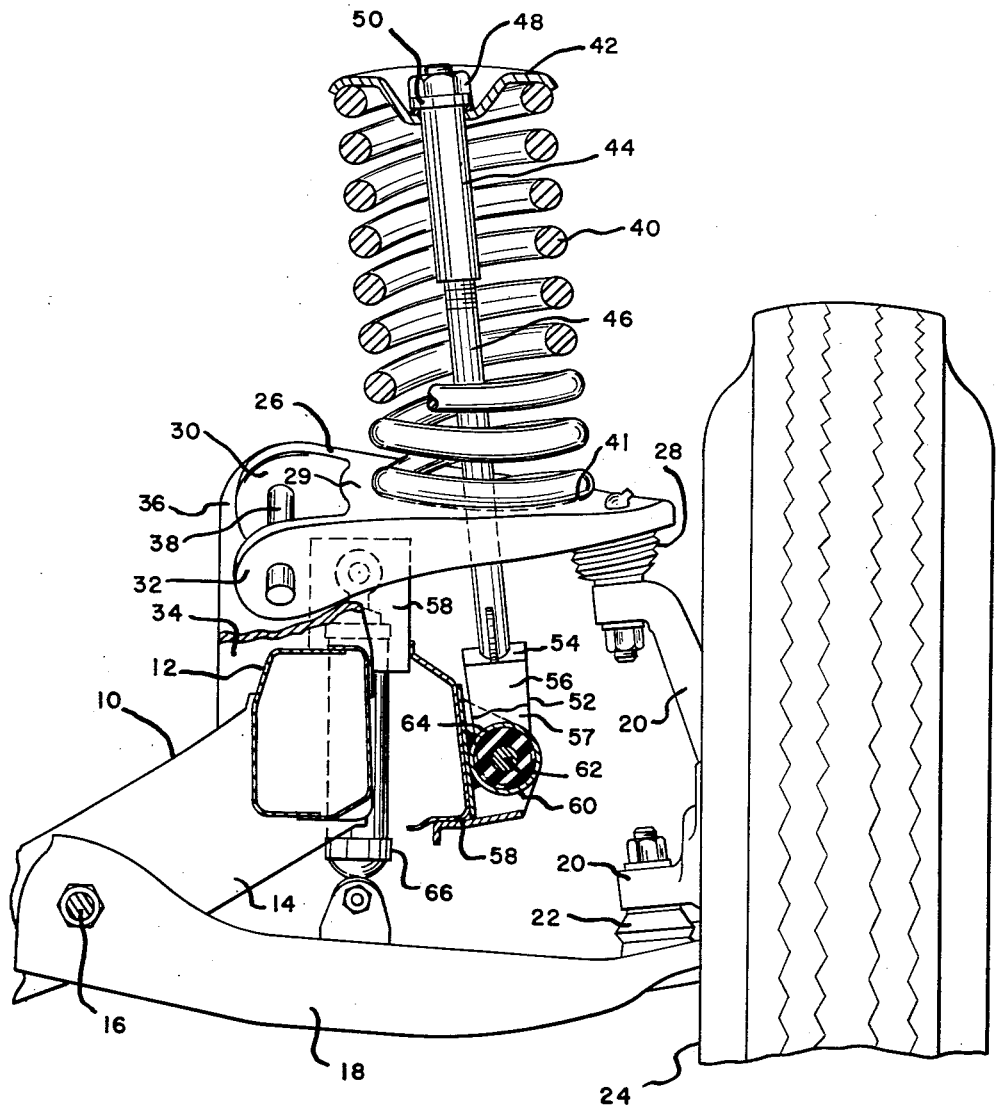
INVENTOR.
PAUL FARAGO
BY
WILSON, LEWIS & McRAE
ATTORNEYS United States Patent Office 3,039,788
Patented June 19, 1962

1

3,039,788
STEERABLE WHEEL VEHICLE SUSPENSION
ARRANGEMENT
Paul Farago, 725 Fairford Road,
Grosse Pointe Woods, Mich.
Filed Sept. 30, 1959, Ser. No. 843,505
5 Claims. (Cl. 280—96.2)

This invention relates to vehicle suspensions, and particularly to such suspensions having desired features of adjustability, easy installation, and ready accommodation in otherwise unusable locations such as to permit a relatively low vehicle floor location.

In the conventional front wheel vehicle suspension there are usually employed a pair of upper and lower steering knuckle control arms having ball joint connections with the wheel-carried steering knuckle, with a coil-type suspension spring being positioned between the lower control arm and a portion of the frame. The conventional arrangement of parts is such that removal of the suspension spring is a rather difficult and time-consuming operation. Thus, the spring-removal operation requires disassembly of the ball joint connection between the lower control arm and the steering knuckle, as well as a temporary support of the spring during the removal operation. Installation and replacement of the spring is an equally difficult operation.

In the conventional construction there is no arrangement for compensating for spring sag such as is occasioned by age, overloading, or hard driving on bad roads. Any adjustment of the spring is effected by the use of spacers between the spring and lower control arm. Such spacers are usually about three-eighths inch in thickness, and the spring is usually of such short length that no more than two spacers are permitted to be utilized for spring-height adjustment purposes without deleterious effect on the spring action. If the spring has sagged sufficiently to require more than two spacers, it is usually recommended that a new spring be installed. Whether the spring sag is attempted to be alleviated by spacers or by the installation of a new spring, the operation is time-consuming and relatively costly.

In some vehicle suspensions a torsion bar arrangement has been substituted for the independent coil springs on the front wheels. The torsion bar arrangement has several advantages. However, one disadvantage of the torsion bar arrangement is the fact that it requires the vehicle floor to be located at a relatively high level, as for example two and one-half inches to three inches above the level obtained when using the independent coil spring suspension arrangements.

One object of the present invention is to provide a vehicle suspension having the best features of the torsion bar arrangements and independent coil spring arrangements, and having additional features of adjustability and ease of installation not present with either of the conventional arrangements.

A further object of the invention is to provide a vehicle suspension employing a coil spring, wherein the spring can be readily adjusted to compensate for spring sag such as is caused by age, overloading, or hard driving on bad roads.

A further object of the invention is to provide a vehicle suspension having spring adjustment means which eliminates the conventional hard-to-install spacers conventionally employed.

An additional object of the invention is to provide a spring suspension which can be installed, removed, and serviced in a minimum time period.

Other objects of this invention will appear in the following description and appended claims, reference being had to the accompanying drawings forming a part of this specification wherein like reference characters designate corresponding parts in the several views.

In the drawings:

The single FIGURE is a rear elevational view of a vehicle suspension for the right front wheel of a conventional automotive vehicle.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawing, there is disclosed a vehicle frame 10 comprising a longitudinal side rail 12 and a laterally extending brace portion or bulkhead 14 located at the front portion of the rail. Brace portion 14 is pivotally connected at 16 with a steering knuckle lower control arm 18, said control arm being in turn universally connected with the conventional steering knuckle 20 by means of the ball joint 22. It will be appreciated that the steering knuckle is provided with a spindle which extends axially within the wheel hub for mounting of the wheel and tire 24. A steering arm (not shown) is provided for operating the steering knuckle to turn the wheel and steer the vehicle. The upper end portion of steering knuckle 20 is connected with a steering knuckle upper control arm 26 by means of the ball joint 28.

In the illustrated embodiment the upper control arm 26 is formed as a pressed element defining an upper wall 29 and two side walls 30 and 32. However it will be appreciated that arm 26 could be formed in numerous ways, as for example by interconnected bars of the type presently employed by one of the well-known automobile manufacturers. The upper control arm is fulcrumed on frame 10 by means of two upstanding frame extensions 34 and 36, and a shaft 38, said shaft extending through the side wall portions 30 and 32 as well as the frame extensions 34 and 36. Suitable bearings and retainer devices are provided for positionment of the shaft in its desired location.

It will be noted that shaft 38 is angled rearwardly and downwardly from the horizontal, the arrangement being such that shaft 38 takes an angle of approximately 14° inclination relative to the axis of pivot 16. This inclination is for the purpose of minimizing "front end dive." Thus, in operation of the vehicle when a braking force is applied the tendency of the vehicle front end to dive has the effect of rotating the wheel spindle assembly in a rearward direction while the braking torque tends to rotate the wheel spindle assembly in a forward direction. The opposing tendencies are nearly equal and the "front end dive" is held to a predetermined minimum.

For purposes of suspending the frame there is provided a coil-type compression spring 40 having its lowermost convolution seated on the upper wall 29 of control arm 26. Wall 29 may be formed with a circular concavity 31 therein to seat the spring in the desired location, but it will be realized that other seating means could also be employed. The upper end of the spring 40 engages a retainer structure in the form of a disk 42 which is provided with a central opening for reception of the elongated nut 44. In the illustrated embodiment the lower end portion of the nut is of reduced outside diameter to extend through a washer 50 which abuts against disk 42. The enlarged upper end portion 48 of the nut is hexagonally shaped for turning of the nut by a wrench (not shown). The purpose in forming nut 44 as an elongated structure is to ensure that the nut can be installed onto the threaded portion of thrust rod element 46 without having to mechanically compress spring 40. Thus even if the spring in a given situation had a slightly oversize free length the nut could still be threaded onto rod element 46 without first compressing the spring.

The lower end of rod 46 is carried in a U-shaped element 52 having a web portion 54 and two parallel flange portions 56 and 57, the arrangement being such as to put rod 46 in tension between retainer 42 and frame 10. Retainer 42, nut 44 and rod 46 cooperate together to define a connector device between spring 40 and frame 10. Nut 44 and rod element 46 may be considered as defining an adjusting length rod structure.

In order to mount rod element 46 the frame 10 is provided with an extension 58 which has welded thereto the sleeve 60. The aforementioned parallel arms 56 and 57 carry the shaft 62, and rubber bushing 64 is bonded on its outer and inner surfaces to the sleeve 60 and shaft 62 so as to form a resilient connection between rod 46 and the vehicle frame 10. The rubber bushing provides a pivotal connection which requires no lubrication; additionally it contributes some added resilience to the vehicle suspension as well as an advantageous noise dampening action, the arrangement being such that wheel noises are effectively prevented from being transmitted into the vehicle frame. It will be appreciated that spring 40 serves as the primary suspension means between the vehicle wheel and the right front portion of frame 10. A similar vehicle suspension arrangement may be employed on the left front wheel of the vehicle.

In operation of the vehicle, any up and down movement of tire 24 occasioned by bumps, ruts, and the like results in a corresponding pivotal movement of the control arms 18 and 26. As control arm 26 moves upwardly it compresses the spring 40 sufficiently to maintain the frame 10 in a substantially level-ride position. The rubber bushing 64 also contributes a resilient effect and noise-dampening effect so as to promote a smooth quiet level ride. The conventional shock absorber 66 may be provided between the control arm 18 and frame extension 58 to absorb the excess energy stored up in spring 40 during heavy shock loads, the action being such as to further improve the vehicle ride.

It will be noted that the strength or stiffness of spring 40 can be adjusted by turning the nut 44 upwardly and downwardly on the threaded portion of rod 46. Thus by turning nut 44 downwardly on the rod 46 the strength or stiffness of spring 40 can be increased; conversely by turning nut 44 upwardly a relatively weaker spring action can be secured. After extended operation of the vehicle, the suspension spring tends to weaken which results in an off-balance of the vehicle and an insufficient cushioning action. By adjusting the nut 44 these disadvantageous conditions may be readily alleviated. In present vehicles the position of spring 40 and rod 46 is such that nut 44 is in an easily accessible location, and adjustment of the nut is a relatively quick operation. This is in contrast to the conventional suspension arrangements wherein the springs are located between the vehicle frame and the lower control arm. Thus, as applied to the illustrated vehicle-wheel arrangement the conventional suspension spring would be located between vehicle frame 10 and lower control arm 18, opposed cup-like seating structures being provided on the frame and lower arm for spring-housing purposes. Such an arrangement is disadvantageous because it greatly hampers adjustment of the spring. Conventionally there is no spring-sag adjustment such as is provided by the nut 44. The conventional arrangement necessitates the use of spacers between the lower end of the spring and the lower control arm for spring sag adjustment purposes. These spacers require the use of temporary suspension devices and disassembly of the lower ball joint 22. The required operations are very time-consuming. With the illustrated arrangement the adjustment of the spring may be readily and quickly accomplished by turning of the nut 44. Since the nut is inherently capable of a fine adjustment action, the illustrated arrangement may be utilized to achieve a comparatively accurate adjustment of the spring. In the conventional arrangement the use of spacers for spring sag adjustments is restricted to a relatively coarse spring sag adjustment, as for example one-half inch.

In the illustrated embodiment when a new spring is required the removal of the old spring and installation of a new spring is very quickly and readily accomplished, since neither of the ball joints 22 or 28 need be disassembled. The vehicle can be jacked up with the weight of the frame 10 on the jack so as to allow the control arms to pivot downwardly above their pivots and lessen the forces on the spring. Nut 44 can then be removed to permit removal of the old spring and replacement of the new spring.

While a spring suspension employing components of a specific shape has been illustrated in the drawings, it will be appreciated that certain variations in arrangement and construction of the component parts can be employed without departing from the spirit of the invention as defined in the appended claims.

I claim:

1. A vehicle suspension comprising a vehicle frame; upper and lower steering knuckle control arms pivotally carried by said frame; a steering knuckle interconnecting the end portions of said control arms; a compression coil spring having one of its endmost convolutions seated on the upper control arm and having its other endmost convolution positioned a substantial distance thereabove; a spring retainer engaging said other endmost convolution; a tensioned rod structure extending from said retainer downwardly through the spring and upper control arm; and a pivotal connection between a portion of the frame and the lower end portion of said rod structure whereby the spring supports the weight of the frame on the upper control arm said pivotal connection comprising a shaft carried by one of said tensioned rod and frame, a sleeve carried by the other of said tensioned rod and frame, and a rubber bushing interposed between the shaft and sleeve.

2. In a vehicle having a frame with upper and lower steering knuckle control arms pivotally carried at one end by the frame and a steering knuckle pivotally interconnecting the other ends of the control arms, the improvement of a compression spring having its lower end seated on top of the upper control arm to extend vertically above the upper control arm, a spring retainer positioned on the upper end of said spring, a rod, means adjustably connecting one end of said rod to said spring retainer, and a pivotal connection between the other end of said rod and the frame, said pivotal connection comprising a shaft carried by one of said rod and frame, a sleeve carried by the other of said rod and frame, and a resilient bushing interposed between said shaft and said sleeve.

3. In a vehicle having a frame with upper and lower steering knuckle control arms pivotally connected at one end to the frame and a steering knuckle pivotally interconnecting the other ends of the control arms, the improvement of a hole formed centrally in the upper control arm, a coiled compression spring having the lower end seated on top of the upper control arm around said hole, an annular spring retainer positioned over the upper end of said spring, a rod positioned within said spring, said rod having an upper threaded end adapted to extend through said annular spring retainer and a lower end extending through said hole in the upper control arm, an elongated, threaded sleeve extending through said annular spring retainer and turned onto said upper end of said rod, said sleeve having a shoulder adapted to engage said retainer, and a pivotal connection between the other end of said rod and the frame, said pivotal connection comprising a U-shaped yoke having its bight portion connected to the bottom end of said rod and parallel arms extending downwardly therefrom, a shaft carried by said arms of said yoke, a tube mounted on the frame, said shaft being positioned within said tube, and a resilient bushing secured between said shaft and said tube.

4. In a vehicle having a frame with upper and lower steering knuckle control arms pivotally mounted at one end to the frame and with a steering knuckle pivotally interconnecting the other ends of the control arms, the improvement of a hole in the upper control arm, a coiled compression spring having the lower end seated on top of the upper control arm around said hole, a spring retainer positioned on the upper end of said spring, a rod positioned within said spring and passing through said hole in the upper control arm, said rod having a threaded upper end extending through said spring retainer, an elongated sleeve threaded onto said upper end of said rod, said sleeve having a shoulder engaging said retainer, and a pivotal connection between the other end of said rod and the frame, whereby the tension of said spring can be adjusted or said spring can be removed without an auxiliary compressor.

5. The combination defined in claim 4 wherein said pivotal connection between said other end of said rod and the frame comprises a shaft carried by one of said rod and frame, a sleeve carried by the other of said rod and frame, and a resilient bushing interposed between the shaft and said sleeve.

References Cited in the file of this patent

UNITED STATES PATENTS

| | | |
|---|---|---|
| 1,325,832 | Coburn | Dec. 23, 1919 |
| 2,117,588 | Armstrong | May 17, 1938 |
| 2,262,310 | Woolridge | Nov. 11, 1941 |
| 2,650,108 | Bruce | Aug. 25, 1953 |
| 2,840,386 | McFarland | June 24, 1958 |

FOREIGN PATENTS

| | | |
|---|---|---|
| 168,312 | Switzerland | June 16, 1934 |